No. 638,235. Patented Dec. 5, 1899.
T. H. GLEDHILL.
VELOCIPEDE.
(Application filed Jan. 7, 1899.)
(No Model.)

Witnesses Thomas H. Gledhill, Inventor.
By his Attorneys,

UNITED STATES PATENT OFFICE.

THOMAS H. GLEDHILL, OF LEWISTON, MAINE.

VELOCIPEDE.

SPECIFICATION forming part of Letters Patent No. 638,235, dated December 5, 1899.

Application filed January 7, 1899. Serial No. 701,466. (No model.)

*To all whom it may concern:*

Be it known that I, THOMAS H. GLEDHILL, a citizen of the United States, residing at Lewiston, in the county of Androscoggin and State of Maine, have invented certain new and useful Improvements in Velocipedes, of which the following is a specification.

My invention relates to bicycles and similar vehicles, and particularly to driving mechanism therefor; and the object in view is to provide simple and improved means whereby motion may be communicated from oscillatory pedals to the driving-wheel, the several parts of the mechanism being adapted for adjustment to vary the throw and paths of the pedals, to vary the leverage, and to vary the rate of speed at which the driving-wheel is moved with relation to the pedals, and particularly to provide simple and efficient means whereby the different parts of the mechanism are mounted upon the frame of the vehicle.

Further objects and advantages of this invention will appear in the following description, and the novel features thereof will be particularly pointed out in the appended claim.

Figure 1:
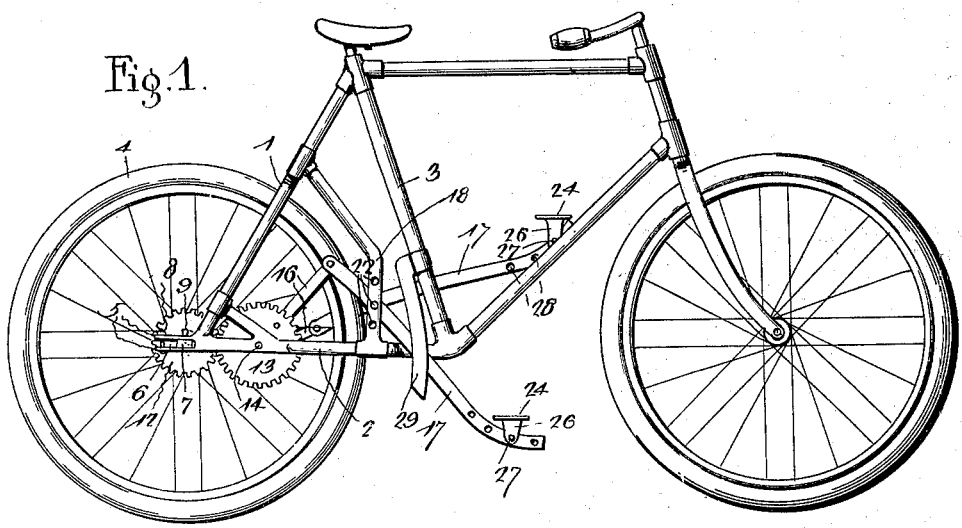
Figure 2:
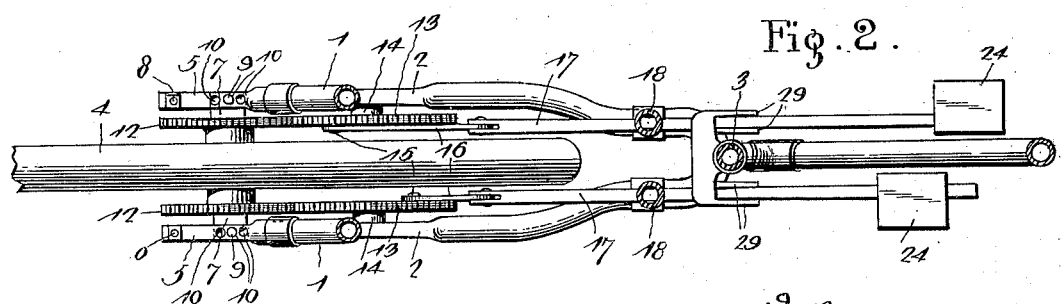
Figures 3, 4, 5:
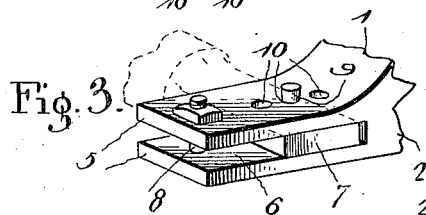
Figures 6, 7:
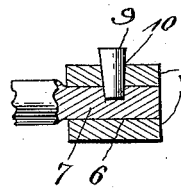

In the drawings, Figure 1 is a side view of a bicycle constructed in accordance with my invention. Fig. 2 is a plan view of the driving mechanism, showing the adjacent portions of the bicycle-frame. Fig. 3 is a detail view in perspective of the means whereby the rear driving-wheel is mounted. Fig. 4 is a detail transverse section of the same. Fig. 5 is a detail sectional view to show the means whereby the pedal-lever is mounted. Figs. 6 and 7 are diagrams showing the relative positions of a pedal-lever and the driving-gear at different fulcrum adjustments of the former.

Similar reference characters indicate corresponding parts in all the figures of the drawings.

In order that the construction and operation of my improved driving mechanism may be readily understood, I have shown the same mounted upon a bicycle of the diamond-frame type, wherein 1 represents the rear fork; 2, the bottom run; 3, the seat-post tube, and 4 the driving-wheel. The rear connected extremities of the rear-fork members and the bottom-run members are extended to form tongues 5, which are bifurcated or slotted longitudinally, as shown at 6, for the reception of the squared extremities of a driving-wheel shaft 7, thus providing for adjustment of the driving-wheel shaft with relation to the frame in a manner similar to the adjustment provided in connection with bicycles of the ordinary type, wherein motion is communicated to the driving-wheel by means of a chain; but in the construction illustrated the means for accomplishing this adjustment of the rear axle and for securing the same in place differ from those in common use. Preferably the rear extremities of the members of the tongue 5 are connected by a stop-pin which spans the mouth of the slot to prevent accidental displacement of the driving-wheel shaft, said pin consisting, preferably, of a bolt, whereby the connected members may be drawn toward each other to frictionally clamp the axle end in place at the desired adjustment. To guard against loosening the movement of the driving-wheel axle by the jarring of the machine in use, I also in practice find it desirable to employ auxiliary means for holding the same in place, such as a locking-pin 9, constructed to fit in either of a series of openings 10 in the bifurcated tongue and to engage a socket 11 in the axle end. Attached to the driving-wheel hub is a driven gear 12, with which meshes a driving-gear 13, having its spindle 14 mounted in a bearing in the bottom run. The driving and driven gears are preferably used in duplicate, one being arranged upon each side of the plane of the driving-wheel. The driving-gear 13 constitutes a crank-gear and is provided with a wrist-pin 15, connected by a link or pitman 16 with one of the pedal-levers 17. To change the gear of the machine or the relative speed of rotation of the driving-wheel, it is necessary simply to remove the rear-wheel axle 7, substitute the desired driven gear for that previously attached to the driving-wheel, and return the parts with a suitable adjustment of the axle to suit the diameter of the substituted gear.

The pedal-levers are mounted in auxiliary frame-bars 18, which connect the members of the rear fork with those of the bottom run, respectively, said frame-bars serving as braces and as means for distributing the strain due to the operation of the pedal-levers to divergent elements of the frame. The frame-bars are slotted vertically, as shown at 19, to receive the pedal-levers, and the latter are provided with terminally-coned pivot-pins 20 for engagement with adjustable bearings carried by the frame-bars at opposite sides of said slots. In the construction illustrated each of these bearings consists of a cup 21, threaded in a transverse opening 22 in the frame-bar and accessible at its outer side from the side of the frame to provide not only for adjustment, but for removal, said cup being recessed to receive the adjacent cone of the pivot-pin and containing anti-friction balls or rollers 23 for contact with said cone. Each frame-bar is provided with transversely-alined twin openings 22 and preferably with a plurality or series of such openings, whereby the fulcrum-pin of the lever which is mounted upon said frame-bar may be varied in adjustment to suit the reach of the rider, it being obvious that by arranging the bearing-cups in upper sockets or openings of the frame-bars the front ends of the levers, which are provided with the pedals 24, will be correspondingly raised. It is also desirable under certain circumstances to vary the relation between the lengths of the lever-arms, and hence each lever is provided with a longitudinal series of transverse openings 25 for the reception of the pivot-pin, suitable means being provided to prevent independent movement of the lever and pin in the direction of swinging movement of the lever. Thus adjustment of the fulcrum-pin of each lever may be made either in a direction parallel with or transverse to the length of the lever to vary the elevation of the pedal and to vary the relative lengths of the lever-arms, and the second-named adjustment has the effect of varying the position of the link or pitman with relation to the length of the lever to alter the toggle action of the lever and link, it being obvious that with the parts in the position shown in either Fig. 6 or Fig. 7 the depression of the pedal will cause an upward swinging movement of the rear end of the lever, and thus a toggle action upon the driving-gear, which gives the operator an efficient power in actuating the driving mechanism. Figs. 6 and 7 respectively show the relations between the lever and the link or pitman at two different adjustments of the lever-fulcrum. I also preferably construct the pedal for adjustment longitudinally of the lever by providing it with depending spaced ears 26, arranged upon opposite sides of the lever and engaged by a pivot-pin 27, which is adapted to fit in either of a plurality of openings 28 in the lever. The front ends of the levers are also preferably upturned slightly or curved to compensate for the upward swing of the foot of the operator as it moves forward, and thus to facilitate the efficient communication of motion to the lever at all points in its path. To prevent lateral displacement or straining of the levers, I employ guides 29, which are preferably attached to the seat-post tube and depend to receive the levers at an intermediate point.

From the foregoing description it will be seen that the device embodying my invention is simple and that the communication of motion is direct, while any desired relative adjustment of the parts may be obtained to suit the peculiarities and preferences of the rider. It will be understood, furthermore, that various changes in the form, proportion, size, and minor details of construction within the scope of the appended claim may be resorted to without departing from the spirit or sacrificing any of the advantages of the invention.

Having described my invention, what I I claim is—

In a bicycle, the combination with a frame-bar comprising spaced members provided with openings upon opposite sides of the space formed therebetween, bearings adjustably mounted in the openings, a pedal-lever passed between the members, a fulcrum-pin carried by the pedal-lever and adapted to engage said bearings interchangeably, pedals connected with the levers and adjustable longitudinally thereof, a drive-wheel, and means for transmitting motion from the pedal-levers to the drive-wheel.

In testimony whereof I have hereunto set my hand this 5th day of January, 1899.

THOMAS H. GLEDHILL.

Witnesses:
 NOEL B. POTTER,
 N. M. EMERY.